United States Patent [19]

Yoshikawa et al.

[11] 4,396,279
[45] Aug. 2, 1983

[54] TRIMMING CONDITION OBSERVING DEVICE IN PICTURE PRINTER

[75] Inventors: Sumio Yoshikawa; Kaoru Uchiyama, both of Kanagawa, Japan

[73] Assignee: Fuji Photo Film Co., Ltd., Kanagawa, Japan

[21] Appl. No.: 316,029

[22] Filed: Oct. 28, 1981

[30] Foreign Application Priority Data

Oct. 31, 1980 [JP] Japan ................................ 55-152187

[51] Int. Cl.³ ........................ G03B 27/52; G03B 27/70
[52] U.S. Cl. ............................................. 355/43; 355/45
[58] Field of Search ............................ 355/45, 44, 43

[56] References Cited

U.S. PATENT DOCUMENTS

| 3,055,266 | 9/1962 | Frantz et al. | 355/45 X |
| 3,431,051 | 3/1969 | Tosti | 355/45 |
| 3,463,585 | 8/1969 | Levine | 355/45 |
| 3,515,477 | 6/1970 | Hein et al. | 355/45 X |
| 4,283,136 | 8/1981 | Swift et al. | 355/45 |

Primary Examiner—Richard A. Wintercorn
Attorney, Agent, or Firm—Sughrue, Mion, Zinn, Macpeak & Seas

[57] ABSTRACT

A convergent lens is pivotable into the optical path of a picture printer simultaneously with pivotting of an observing condition mirror so that the mirror and the observing screen can be made smaller. The mirror is separated into two parts, and the lens, mirror parts and a shutter are moved by a simple link mechanism.

10 Claims, 4 Drawing Figures

TRIMMING CONDITION OBSERVING DEVICE IN PICTURE PRINTER

BACKGROUND OF THE INVENTION

This invention relates to a picture printer in which the trimming work can be readily achieved with an easy-to-see screen having a suitable size, and more particularly to a picture printer in which, after an original picture projected onto an observing screen through a movable mirror, a movable shutter and a movable Fresnel lens is trimmed while being observed, the original picture is printed on a photo-sensitive material.

It is well known in the art to trim an original picture on a negative film to a desired size while it is projected onto an observing screen through reflection. If the size of a photosensitive material used is larger than $6\frac{1}{2}''\times 8\frac{1}{2}''$, it is necessary to use a large observing screen on which an image is formed by means of a printing lens system, in order to perform the trimming work. Accordingly, it is necessary to provide a considerably large space for the observing screen which is disposed between the printing lens system and the photo-sensitive material, which necessarily increases the size of the picture printer and makes the operation of the picture printer intricate. Thus, the conventional method has been unsatisfactory for these reasons.

SUMMARY OF THE INVENTION

In view of the above-described drawbacks, an object of this invention is to provide a picture printer used for photo-sensitive materials larger than $6\frac{1}{2}''\times 8\frac{1}{2}''$, which has an observing screen the size of which is not extremely large and can be readily handled in a human engineering sense.

The foregoing object of the invention can be achieved by the provision of a trimming condition observing device in a picture printer in which an original picture is illuminated by a light source so that the image of the original picture is formed by means of a lens system on a photo-sensitive material accomodated in an easel device, the trimming condition observing device having an observing screen for observing the trimming condition of the original picture and being disposed between the easel device and the lens system. According to this invention, the trimming condition observing device comprises: a convergent lens which is positioned so as to converge light passed through the lens system in a trimming condition observation position and is retracted from the optical path in a printing operation; a movable mirror which reflects towards the screen the light converged by the convergent lens in the trimming condition observation and is retracted from the optical path in the printing operation to cover the screen; a shutter device which intercepts light to the easel device during the trimming condition observation and is retracted from the optical path in the printing operation; and drive means for driving the convergent lens, movable mirror and shutter device in a predetermined order.

BRIEF DESCRIPTION OF THE DRAWINGS

This invention will now be described with reference to the accompanying drawings, in which.

DESCRIPTION OF THE PREFERRED EMBODIMENTS

Figure 1:
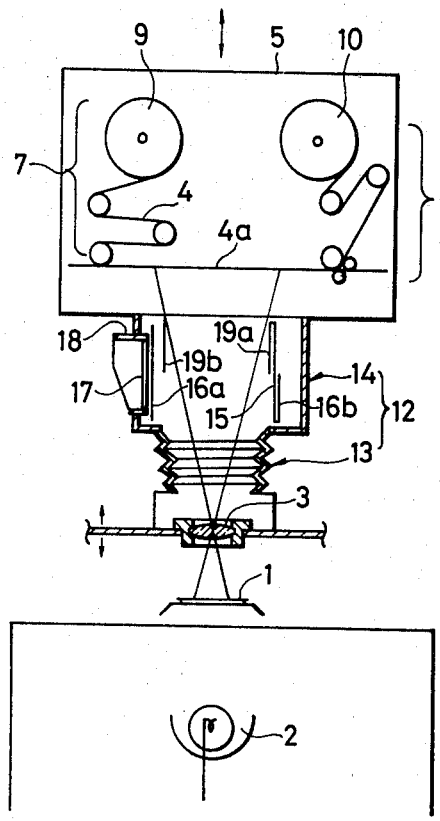
FIG. 1 is a schematic sectional view showing the entire arrangement of a picture printing device according to this invention.

FIG. 1 is a schematic sectional view showing one example of a picture printing device according to the invention. An original picture 1 such as a negative film 1 illuminated by a light source 2 disposed below the original picture 1. The image of the picture on the negative film 1 is formed by a lens system 3 on a photo-sensitive material 4 set on an image forming plane 4a. That is, the original picture 1 and the photo-sensitive material 4 on the image forming plane 4a are positioned to satisfy the lens formula, while the lens system 3 and an easel 5, which accomodates the photo-sensitive material 4 in a conventional manner and is shielded from external light, are vertically movably supported. As shown in FIG. 1, in the easel 5 the photo-sensitive material 4 is supplied from a supply roll 9 through a group of supplying rollers 7 including idle rollers and dancer rollers to the image forming plane 4a, and is then wound on a winding roller 10 through a group of winding rollers 8 including a pinch roller, an idle roller and a dancer roller. The photo-sensitive material on the image forming plane 4a is shielded from the photo-sensitive material wound on the supplying rollers and the winding rollers. An intermediate section 12 is provided between the lens system and the easel. The intermediate section 12 is made up of a bellows 13 and an observation section 14 so that, during a printing operation, light from the lens system reaches the photo-sensitive material 4 on the image forming plane 4a.

Figure 2:
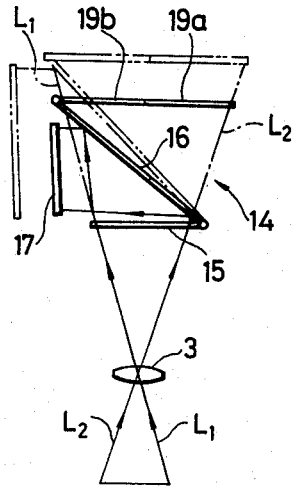
FIG. 2 is an explanatory diagram showing the positions of various turning members in FIG. 1 in a trimming condition observation.

FIG. 2 shows the relationships between the intermediate section 12 and light passing through the lens system 3 during a trimming condition observation. The observation section 14 is so designed that, in the trimming condition observation, ligh from the light source passes through the negative film 1, the lens system 3 and a movable Fresnel lens 15 serving as a convergent convex lens, is reflected by a movable mirror 16, and is then projected onto a screen 17 with a hood 18. A pair of movable shutters 19a and 19b are provided in such a manner that, in the trimming condition observation, they are moved to intercept light to the image forming plane 4a. In FIG. 2, reference characters $L_1$ and $L_2$ designate peripheral rays. If the Fresnel lens 15 is not used then the rays $L_1$ and $L_2$ are not subjected to convergent action, and accordingly advance as indicated by the dotted lines. Therefore, in this case, the sizes of the movable mirror 16, the movable shutters 19a and 19b and the screen 17 must be increased.

Figure 3:
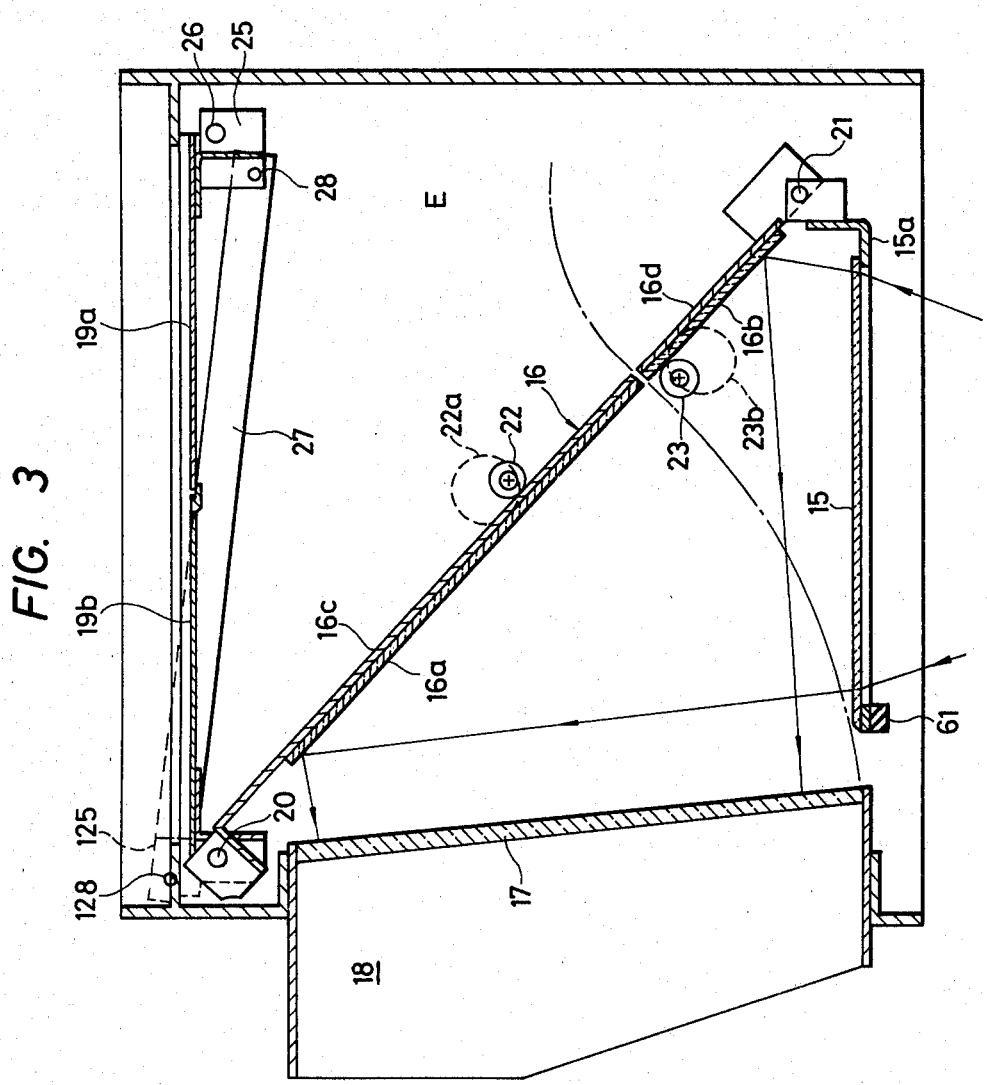
FIG. 3 is a sectional side view showing the essential components of the picture printing device according to this invention.

FIG. 3 is a sectional view showing the various components in detail which carry out the above-described movement. The movable mirror 16 is made up of the upper movable mirror 16a which is supported by the upper mirror supporting member 16c, and the lower movable mirror 16b which is supported by the lower mirror supporting member 16d. The upper mirror supporting member 16c is fixedly secured to a rotary shaft 20 which is rotatably supported on the side wall of a body F. On the other hand, the lower mirror supporting member 16d is pivotally mounted on a rotary shaft 21 which is rotatably supported on the side wall of the body F. The length of the upper movable mirror 16a is so selected that, when the upper movable mirror 16a has turned with the rotary shaft 20, the mirror 16a covers the screen 17 completely. The upper mirror supporting member 16c and the lower movable mirror 16d are abutted against eccentric stoppers 22 and 23, respectively, at positions out of the optical path. The lower movable mirror 16b is urged to abut against the eccentric stopper 23 by a spring (not shown). The positions of the eccentric stoppers 22 and 23 can be finely adjusted so that the image of the boundary between the upper and lower movable mirrors 16a and 16b is not projected onto the screen.

The Fresnel lens 15 is supported by a frame member 15a which is fixedly secured to the aforementioned rotary shaft 21. The frame member 15a supporting the Fresnel lens 15 is held by a stopper 61 serving also as a damper so that the lens is perpendicular to the optical axis, i.e. it is horizontal in FIG. 3.

The shutter 19a is fixedly secured to a rotary lever 25 which is rotatably supported on the side wall of the body F by means of a rotary shaft 26. One end portion of a link 27 is coupled through a pin 28 to the inner portion of the rotary lever 25. For the shutter 19b, a link mechanism similar to that described above is provided at the other end portion of the link 27. More specifically, the other end portion of the link 27 is rotatably coupled through a pin 128 to a lever 125 which is integral with the shutter 19b, and the lever 125 is pivotally mounted on the rotary shaft 20 which is provided on the side wall of the body F. Thus, the shutter 19b will be turned in synchronism with the shutter 19a.

Figure 4:
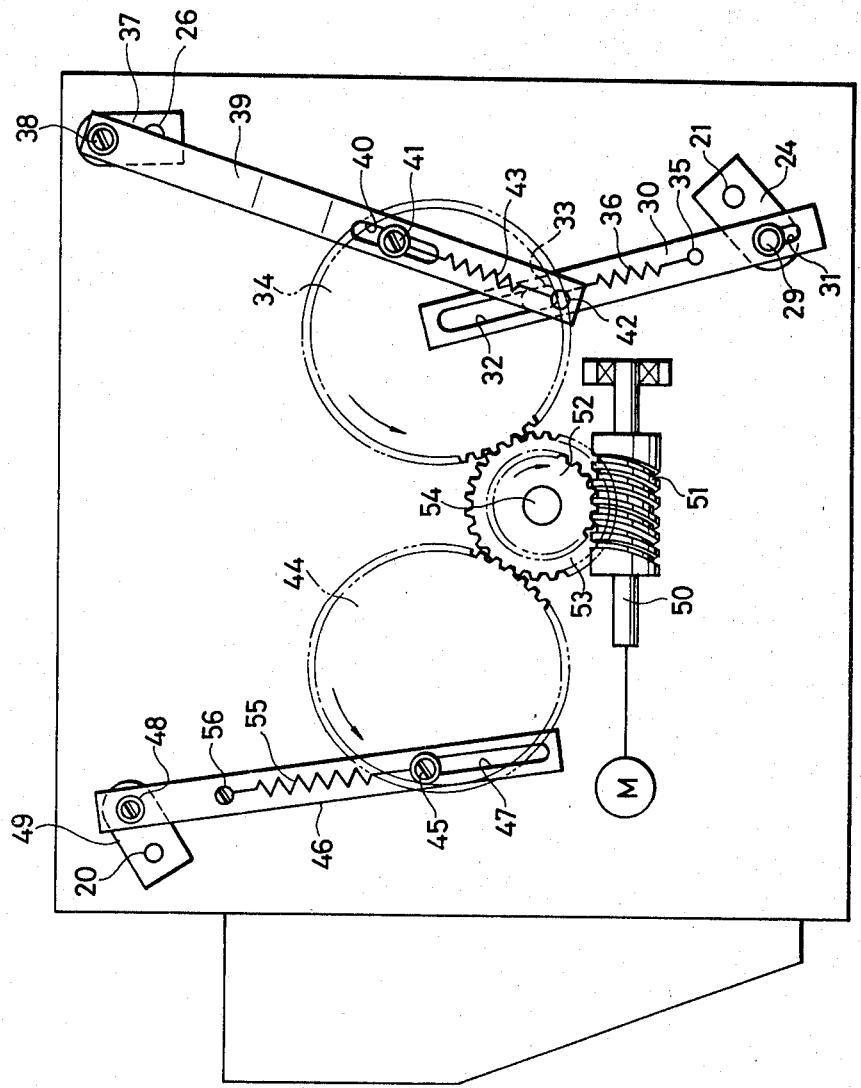
FIG. 4 is a side view of the essential components shown in FIG. 3.

FIG. 4 is a side view of a link mechanism which drives the rotary shafts 20, 21 and 26 which are adapted to turn the movable mirror 16, the Fresnel lens 15 and the shutters 19a and 19b, respectively. One end portion of a rotary lever 49 is fixedly secured to the rotary shaft 20 to which the upper mirror supporting member 16c supporting the upper movable mirror 16a is connected. A pin 48 is embedded in the other end portion of the rotary lever 49. One end portion of a link 46 is rotatably coupled to the rotary lever 49 through the pin 48, and an elongated hole 47 is formed in the other end portion of the link 46. The link 46 is rotatably coupled to a pin 45 which is embedded in a drive gear 44, and a spring 46 is connected between the pin 45 and a pin 56 on the link 46 so as to urge the link downwardly.

A pin 29 is embedded in one end portion of a lever 24 the other end portion of which is fixedly secured to the rotary shaft 21. The pin 29 is rotatably coupled to one end portion of a link 30 through an elongated hole 31. An elongated hole 32 is formed in the other end portion of the link 30, with which a pin 33 embedded in a drive gear 34 is engaged. A spring 36 is connected between the pin 33 and a pin 35 on the link 30, to urge the link 30 upwardly. The spring 36, in cooperation with the damper stopper 61, serves to absorb the impact which is caused by the weight of the assembly of the Fresnel lens 15 and its frame member 15a when the Fresnel lens 15 is turned from its vertical position to the horizontal position. Furthermore, the spring 36 serves to give a predetermined time lag to the link mechanism.

One end portion of a rotary lever 37 is fixedly secured to the shutter rotary shaft 26, and a pin 38 is rotatably provided on the other end portion of the rotary lever 37. The pin 38 is rotatably coupled to one end portion of a link 39, in the other end portion of which an elongated hole 40 is formed. A pin 41 embedded at a different position on the drive gear 34 is slidably inserted in the elongated hole 40, and a spring 43 is connected between the pin 41 and a pin 42 on the other end portion of the link 39, to urge the link 39 upwardly. The power of a reversible electric motor M is transmitted to a worm shaft 50 with a worm gear 51, and the worm 51 is engaged with a gear 52. The gear 52 and a spur gear 53 are mounted on a common shaft 54, and the spur gear 53 engages with the drive gears 34 and 44.

The operation of the picture printer thus constructed will now be described. When the original picture 1 of the negative film is trimmed, the various components shown in FIGS. 3 and 4 are positioned as described above. Therefore, the light beam from the lens 3 is converged by the Fresnel lens 15 and is then reflected towards the screen 17 by the movable mirrors 16a and 16b which have been held in alignment, so that the image is formed on the screen 17.

After completion of the trimming work, the original picture 1 is fixed by appropriate means and is then turned in a predetermined direction by the motor M which is controlled by microswitch means (not shown). The power of the motor M is transmitted to the worm shaft 50. Through the engagement of the worm gear 51 and the gear 52, the power transmission direction is changed, and the speed is reduced to a predetermined number of revolutions per minute. In this operation, the transmission gear 53 mounted on the shaft 54 of the gear 52 starts its revolution.

As the transmission gear 53 turns, the link drive gears 34 and 44 are turned in predetermined directions. First, the turning of the upper movable mirror 16a will be described. The pin 45 of the drive gear 44 is turned counterclockwise, and therefore the link 46 is moved in the direction of rotation of the pin with the aid of the elastic force of the spring 46. Accordingly, the lever 49 is turned through a predetermined clockwise angle until the screen is covered by the mirror. Thereafter, with the upper movable mirror 16a maintained abutted against the screen 17, the pin 45 leaves the abutting end of the elongated hole 47. Therefore, the spring 55 is pulled, so as to push the mirror against the screen.

On the other hand, since the transmission gear 53 also engages with the drive gear 34, the pin 33 embedded in the drive gear 34 is turned counterclockwise. However, since the link 30 is urged upwardly by the spring 36, the lever 24 is maintained as it is (or it is not turned) until the pin 33 has turned through a predetermined angle, i.e. until the link 30 has turned to cause the pin 29 to strike the other end of the elongated hole 31 in the link 30 (or until the upper movable mirror 16a abuts against the screen 17). Thus, the spring 36 and the elongated hole 31 operate to provide a predetermined rotation time lag between the Fresnel lens 15 and the upper movable mirror 16a. As the transmission gear 53 is further turned, the link 30 is raised to cause the pin 29 to strike the lower end of the elongated hole 31. As a result, the lever 24 is then caused to turn clockwise through about 90°, and therefore the Fresnel lens 15 is also turned through about 90° because it is fixedly secured through the frame member 15a to the rotary shaft 21. In this operation, the lower movable mirror 16b abutted against the stopper 23 by the spring (not shown) starts to turn during the rotation of the Fresnel lens 15, thus being moved away from the optical path until the lower movable mirror is set substantially vertically.

Thereafter, although the transmission gear 53 is turned, the lever 24 is not turned because the pin 33 is merely moved along the elongated hole 32.

While the above-described various members are being turned, the pin 41 on the drive gear 34 is also turning. However, since the pin 41 is positioned at the middle of the elongated hole 40, the pin 41 merely turns the link 39 clockwise, but does not turn the rotary shaft 26 or accordingly the lever 37. Therefore, the shutters are maintained closed by the elastic force of the spring 43. When the Fresnel lens 15 and the lower mirror 16b have been held vertically, the pin 41 which has moved diagonally to the left in FIG. 4 is abutted against the lower end of the elongated hole 40 in the link 39. Therefore, as the pin 41 continues to turn counterclockwise, the link 39 is pulled diagonally to the left, to turn the rotary shaft 26 through the lever 37. Accordingly, the shutter 19a is turned downwardly through about 90°. At the same time, the shutter 19b is turned downwardly through about 90° by means of the link 27 and the lever 125. Under this condition, a signal is outputted by a microswitch means (not shown), to stop the rotation of the motor M.

In the above-described order, the upper movable mirror 16a is turned downwardly, and then the Fresnel lens 15 is turned upwardly. During this operation, the lower movable mirror 16b is also turned upwardly. When the two members have been held vertically, the shutters 19a and 19b are turned. Thus, after the trimming condition, a printing condition can be readily obtained wherein the mirrors completely cover the screen, thus intercepting the external light. The printing condition can be changed into the next trimming condition by switching the connection of the motor M, i.e. by turning the motor M in the opposite direction. Thus, the various members can be returned so that the trimming condition can be observed.

Since the Fresnel lens is incorporated in the picture printer as described above, the trimming condition observing device can be made smaller. Furthermore, since the movable mirror is divided into the upper and lower movable mirrors, the limitation on the size of the movable mirror is eliminated, which contributes to a miniaturization of the trimming condition observing device. In addition, because of the division of the movable mirror, it is unnecessary to increase the size of the drive mechanism; more specifically the various members can be operated with a simple drive mechanism.

If conventional solenoids are employed as mechanisms for turning the movable mirrors, the Fresnel lens and the shutter, then the various members can be readily operated in association with one another in the above-described order. However, in this case, noise may be generated by the solenoid.

What is claimed is:

1. In a picture printer of the type wherein an original picture is illuminated by a light source and the image of said original is projected onto a photosensitive material through an optical path including a lens system, a trimming condition observing device including an observing screen for viewing the image to be printed, the improvement characterized in that said trimming condition observing device comprises:

a reflection mirror comprising first and second mirror portions each movable into and out of said optical path between said lens system and said photosensitive material said mirror portions meeting in said optical path to form a substantially continuous mirror surface;

a convergent lens movable into and out of said optical path; and drive means for synchronously driving said first and second mirror portions to move said mirror portions and convergent lens into said optical path whereby light from said lens system passes through said convergent lens and is reflected by said reflection mirror to said observing screen.

2. The trimming condition observing device as claimed in claim 1, further comprising shutter means movable into said optical path to prevent passage of light from said observing device to said photosensitive material when said reflection mirror and convergent lens are in said optical path.

3. A trimming condition observing device as claimed in claim 1, wherein said drive means drives said convergent lens a predetermined time lag after said reflection mirror.

4. A trimming condition observing device as claimed in claim 1, wherein said first and second mirror portions are each movable between at least a first position out of said optical path and a second position in said optical path, one of said mirror portions substantially covering said observing screen in said first position.

5. A trimming condition observing device as claimed in claim 2, wherein said drive means drives said convergent lens, reflection mirror and shutter means in a predetermined order.

6. In a picture printer of the type wherein an original picture is illuminated by a light source and the image of said original is projected onto a photosensitive material through an optical path including a lens system, a trimming condition observing device including an observing screen for viewing the image to be printed, the improvement characterized in that said trimming condition observing device comprises:

a convergent lens movable into and out of said optical path, wherein said convergent lens is fixedly secured to a first rotary shaft and is movable between at least a first position out of said optical path and a second position in said optical path;

a reflection mirror comprised of first and second mirrors, said first mirror being fixedly secured to a second rotary shaft and movable between a first position out of said optical path in which it covers said observing screen and a second position in said optical path, said second mirror being rotatably mounted on said first rotary shaft and being movable between at least a first position out of said optical path and a second position in said optical path, said first and second mirrors meeting in said optical path to form a substantially continuous reflective surface in their second position;

shutter means comprised of a first shutter fixedly secured to a third rotary shaft and a second shutter rotatably mounted on said second rotary shaft, each of said first and second shutters being movable between a first position out of said optical path and a second position in said optical path, said first and second shutters meeting in said optical path in their second position to prevent passage of light from said observing device to said photosensitive material when said reflection mirror and convergent lens are in said optical path; and drive means for driving said first, second and third rotary shafts.

7. A trimming condition observing device as claimed in claim 6, wherein said drive means further comprises a connection link means connecting said first and second shutters for synchroneous movement.

8. A trimming condition observing device as claimed in claim 6 or 7, wherein said drive means comprises rotatable drive gear means having first, second and third pins thereon, an elastically energized link mechanism coupling said first, second and third pins to respective first, second and third rotary shafts, and means for rotating said rotatable drive gear means.

9. A trimming condition observing device as claimed in claim 6, further comprising abutment means for defining the second positions of said first and second mirrors and said convergent lens.

10. A trimming condition observing device as claimed in claim 9, further comprising bias means for biasing said second mirror toward said abutment means.

* * * * *